(12) United States Patent
Aiso

(10) Patent No.: US 7,909,230 B2
(45) Date of Patent: Mar. 22, 2011

(54) ATTACHING CONSTRUCTION AND WELDING METHOD

(75) Inventor: Yoshiaki Aiso, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 113 days.

(21) Appl. No.: 12/327,411

(22) Filed: Dec. 3, 2008

(65) Prior Publication Data

US 2009/0145949 A1 Jun. 11, 2009

(30) Foreign Application Priority Data

Dec. 5, 2007 (JP) ................................. 2007-314567

(51) Int. Cl.
*B23K 20/12* (2006.01)
*B60Q 1/00* (2006.01)
(52) U.S. Cl. ........ 228/112.1; 228/2.1; 228/2.3; 362/368
(58) Field of Classification Search ................ 228/112.1, 228/2.1, 2.3; 362/368
See application file for complete search history.

(56) References Cited

U.S. PATENT DOCUMENTS

| | | | | |
|---|---|---|---|---|
| 4,817,852 A | * | 4/1989 | Hill | 228/114 |
| 4,972,303 A | * | 11/1990 | Machida et al. | 362/520 |
| 6,017,141 A | * | 1/2000 | Sugiyama et al. | 362/520 |
| 6,089,731 A | * | 7/2000 | Sugiyama et al. | 362/310 |
| 6,332,697 B2 | * | 12/2001 | Soga et al. | 362/368 |
| 7,153,010 B2 | * | 12/2006 | Yamada et al. | 362/509 |
| 7,357,547 B2 | * | 4/2008 | King et al. | 362/549 |

FOREIGN PATENT DOCUMENTS

JP 09-282909 A 10/1997
JP 11-310076 A 11/1999

OTHER PUBLICATIONS

Patent Abstracts of Japan, Publication No. 09-282909, Publication Date: Oct. 31, 1997, 1 page.
Patent Abstracts of Japan, Publication No. 11-310076, Publication Date: Nov. 9, 1999, 1 page.

* cited by examiner

*Primary Examiner* — Roy King
*Assistant Examiner* — Michael Aboagye
(74) *Attorney, Agent, or Firm* — Osha • Liang LLP

(57) ABSTRACT

An attaching construction includes a first member having a circular tubular welding portion at a distal end and, at a rear end thereof, a holding portion which is integral with the welding portion. The attaching construction includes a second member having an annular first positioning rib, and an annular second positioning rib inside the first positioning rib. The welding portion is positioned within the first positioning rib, and the welding portion is friction welded in place within the first positioning rib while the first member is rotated.

4 Claims, 7 Drawing Sheets

ATTACHING CONSTRUCTION AND WELDING METHOD

BACKGROUND OF THE INVENTION

1. Field of the Invention

The present invention relates to an attaching construction and a welding method for fixing a vehicle component such as a lamp to a body side of a vehicle.

2. Background Art

FIG. 8 shows an example of a conventional attaching construction of a vehicle component, in which a body attaching member 104, which is a metallic bolt, is attached to a fixing portion 103 provided on a lamp body 102 of a lamp 101 through heated press fitting or the like. In addition, the body attaching member 104 is inserted into and through a body panel 106 via a cushion member 105, and by a fastening member 107 being fastened on to the body attaching member 104, the lamp 101 is fixed to the body panel 106 (for example, refer to Patent Document No. 1).

In addition, as another example of a conventional attaching construction, there is known a lamp in which a slide contact projection provided on a base plate of a locking pin is ultrasonic welded to a surface of a lamp body, which is designed for welding (for example, refer to Patent Document No. 2).

Patent Document No. 1: JP-A-09-282909 (FIG. 6)
Patent Document No. 2: JP-A-11-310076 (FIGS. 4, 5)

In the attaching construction disclosed in Patent Document No. 1 above, however, when the body attaching member 104 is heated and press fitted in the fixing portion 103, a press fit amount is measured by the use of an optical sensor, but there may occur a situation in which press fit amounts vary. In addition, in the event that a body panel 106 side of the fixing portion 103, i.e., a lower end face thereof shown in the figure, is made to project further downwards than a lower end face of a head portion of the body attaching member 104 so press fitted, a force attempting to pullout the body attaching member 104 from the fixing portion 103 is produced when the fastening member 107 is fastened, and this may trigger a fear that the press-fit portion of the fixing portion 103 is broken.

In addition, in such a state that the lower end face of the head portion of the body attaching member 104 so press fitted in the fixing portion 103 is made to project further downwards than the body panel 106 side lower end face of the fixing portion 103, there is caused a problem that the lamp 101 is lifted up from the attaching surface of the body panel 106 after the lamp 101 has been attached to the body panel 106.

Additionally, in order to avoid the effect of heat to the lamp body 102 by the heat in the body attaching member 104, it is necessary to form a non-contact space between the body attaching member 104 and the fixing portion 103. That is, it is necessary to form a depth-wise space for avoiding heated air to be compressed as the body attaching member 104 is press fitted deep into the fixing portion 103. Because of this, the overall depth of the lamp 101 is increased, and due to the depth-wise space so formed, the body attaching member 104 is brought into contact with the fixing portion 103 only on side surfaces thereof, thereby making it difficult to obtain a large securing force.

In addition, in the attaching construction and the welding method described in Patent Document No. 2, because there is provided no means for positioning in ultrasonic welding the slide contact projection provided on the base plate of the locking pin to the surface of the lamp body which is designed for welding, it is not possible to obtain high positioning accuracy.

In addition, in the attaching constructions and the welding methods disclosed in both Patent Document Nos. 1 and 2, because an external device becomes necessary to carry out welding, it becomes difficult to produce the lamp at low cost.

SUMMARY OF THE INVENTION

One or more embodiments of the present invention provide an attaching construction and a welding method able to not only reduce the depth-wise dimension to realize a reduction in size of a lamp, but also, obtain high positioning accuracy. In addition, one or more embodiments of the invention provide an attaching construction and a welding method able to not only obtain a large securing force, but also, realize a reduction in production costs.

According to an aspect of the invention, there is provided an attaching construction including a first member having a circular tubular welding portion at a distal end and, at rear end thereof, a holding portion which is integral with the welding portion, and a second member having an annular first positioning rib and an annular second positioning rib inside the first positioning rib, wherein the welding portion is positioned within the first positioning rib, and the welding portion is friction welded in place within the first positioning rib while the first member is being rotated.

According to the configuration described above, the welding portion of the first member is positioned on an inner circumferential side of the first positioning rib of the second member in such a manner as to be brought into press contact with the second positioning rib to thereby be position in place, and thereafter, the welding portion of the first member is friction welded within the first positioning rib of the second member while being rotated by a hand-held rotary drive tool such as a household electric drill, whereby press fit amounts are made difficult to vary and the positioning of the welding portion is ensured. In addition, because the depth-wise space does not have to be provided, not only can a large securing force be obtained, but also, heat produced at the time of welding can be made difficult to be conducted to the second member side without requiring an external welding device. Consequently, not only can a reduction in lamp size be realized by reducing the depth-wise dimension, but also, high positioning accuracy can be obtained. Additionally, not only can a large securing force be obtained, but also, a reduction in production costs can be realized because no external welding device is needed.

In addition, in one or more embodiments, it is desirable that the welding portion has a raised and recessed configuration having a circular cylindrical welding portion at a center and a circular tubular welding portion on an outer circumference of the circular cylindrical welding portion and that a raised and recessed configuration is formed by the first positioning rib and the second positioning rib in such a manner as to be associated with the welding portion, the welding portion being inserted into the first positioning rib to thereby be brought into press contact with the second positioning rib so as to be positioned in place within the first position rib.

According to the configuration that has been described above, the first member in the form of the raised and recessed portion having the circular tubular welding portion on the outer circumference of the circular cylindrical welding portion is made to travel towards the second member having the raised and recessed configuration which is formed by the first positioning rib and the second positioning rib in such a manner as to be associated with the welding portion of the first member, and the circular tubular welding portion is inserted into the first positioning rib, while the circular cylindrical welding portion is inserted into the second positioning rib, whereby the first member is brought into press contact with the second positioning rib to thereby be positioned in place. Thereafter, the circular tubular welding portion and the circular cylindrical welding portion a refriction welded within the first positioning rib while being rotated. As this occurs, the holding portion of the first member is joined to a rotary drive hand-held tool such as an electric drill and the circular tubular welding portion and the circular cylindrical welding portion are brought into press contact with the second positioning rib. Then, when the electric drill is switched on, the first member starts to rotate, and a friction welding thereof to the second member is started. Consequently, the friction welding of the first member to the second member can be implemented extremely easily.

In addition, in one or more embodiments of the attaching construction, it is desirable that either the first member or the second member is made to have a fusible rib, which is fused at the time of welding.

According to the configuration of the attaching configuration that has been described above, when the circular tubular welding portion and the circular cylindrical welding portion of the first member are brought into press contact with the second positioning rib of the second member, the fusion rib acting as a welding margin is fused so that the first member and the second member are friction welded together. By this configuration, the first member, which is positioned relative to the second member, can be welded without any positioning error in such a manner that the circular tubular welding portion and the circular cylindrical welding portion of the first member are prevented from being fused excessively.

In addition, in one or more embodiments, there is also provided a welding method for welding a first member, which has a welding portion and a holding portion which is integral with the welding portion, to a second member, which has a first positioning rib and a second positioning rib inside the first positioning rib, including a positioning step in which the welding portion is positioned by the second position rib, and a welding step in which the welding portion is friction welded in place within the first positioning rib while the first member is rotated.

According to the welding method described above, the welding portion of the first member is positioned at the second positioning rib of the second member, and the welding portion of the first member is brought into press contact with the second positioning rib of the second member while being rotated. By this configuration, the press fit amount is made difficult to vary, whereby ensured positioning is easily implemented. In addition, as the necessity of providing a depth is obviated, not only can a large securing force be obtained, but also, the necessity of an external device for implementing welding is obviated. Consequently, not only can the depthwise dimension be reduced to reduce, in turn, the size of the attaching construction, but also, high positioning accuracy can be obtained. In addition, not only can a large securing force be obtained, but also, a reduction in production costs can be realized due to the necessity of the external welding device being obviated.

According to the attaching construction and the welding method of one or more embodiments of the invention, the attaching construction and the welding method can be provided that is able to not only reduce the depth-wise dimension so that a reduction in the size of the attaching construction can be realized, but also, obtain high positioning accuracy. In addition, the attaching construction and the welding method can be obtained able to not only obtain a large securing force, but also, realize a reduction in production costs due to the necessity of an external welding device being obviated.

Other aspects and advantages of the invention will be apparent from the following description, the drawings and the claims.

DETAILED DESCRIPTION OF THE EXEMPLARY EMBODIMENTS

Hereinafter, a plurality of embodiments of the invention will be described with reference to the drawings.

First Embodiment

Figure 1:
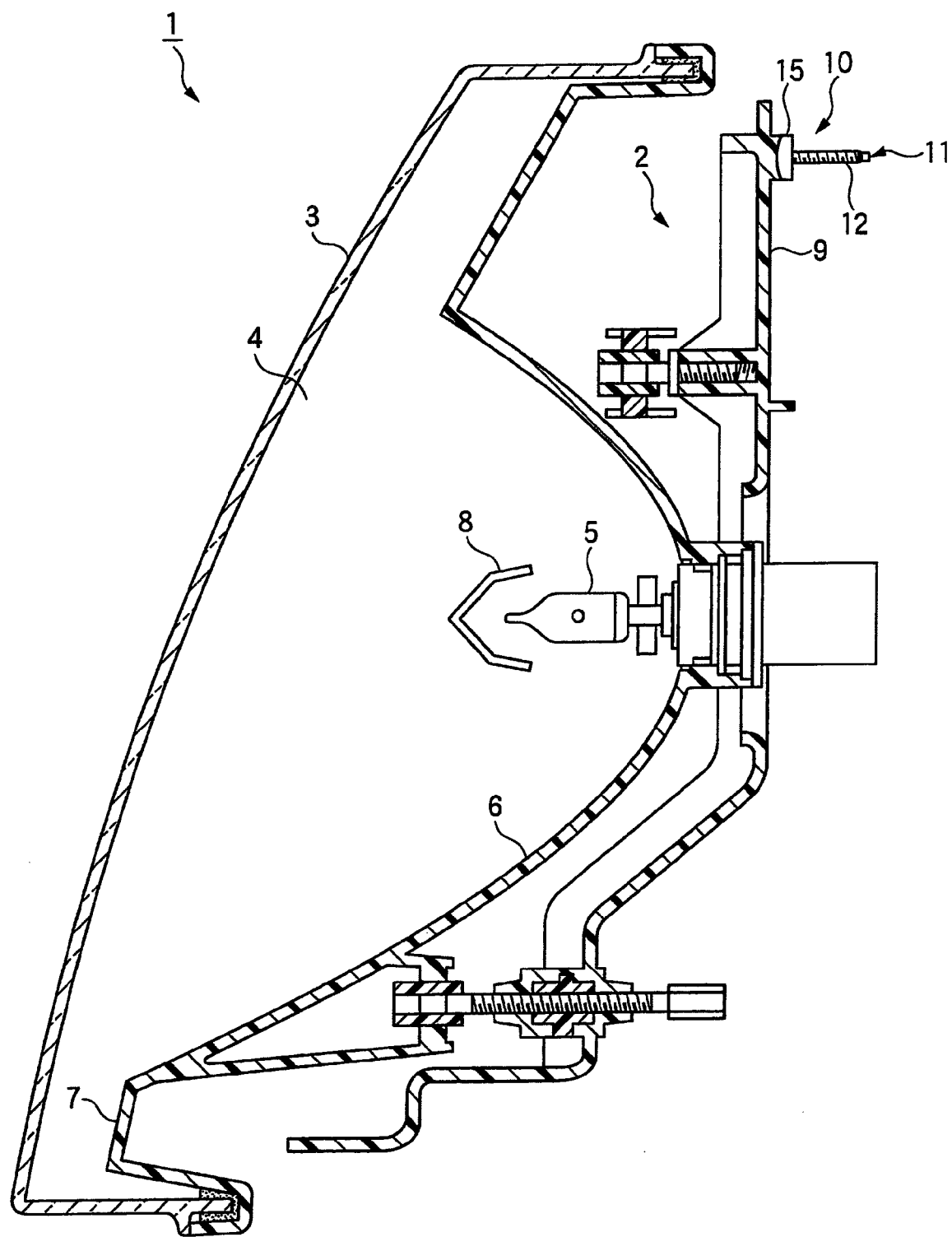
FIG. 1 is a sectional view of a vehicle lamp to which an attaching construction and a welding method according to a first embodiment of the invention are applied.
Figure 2:
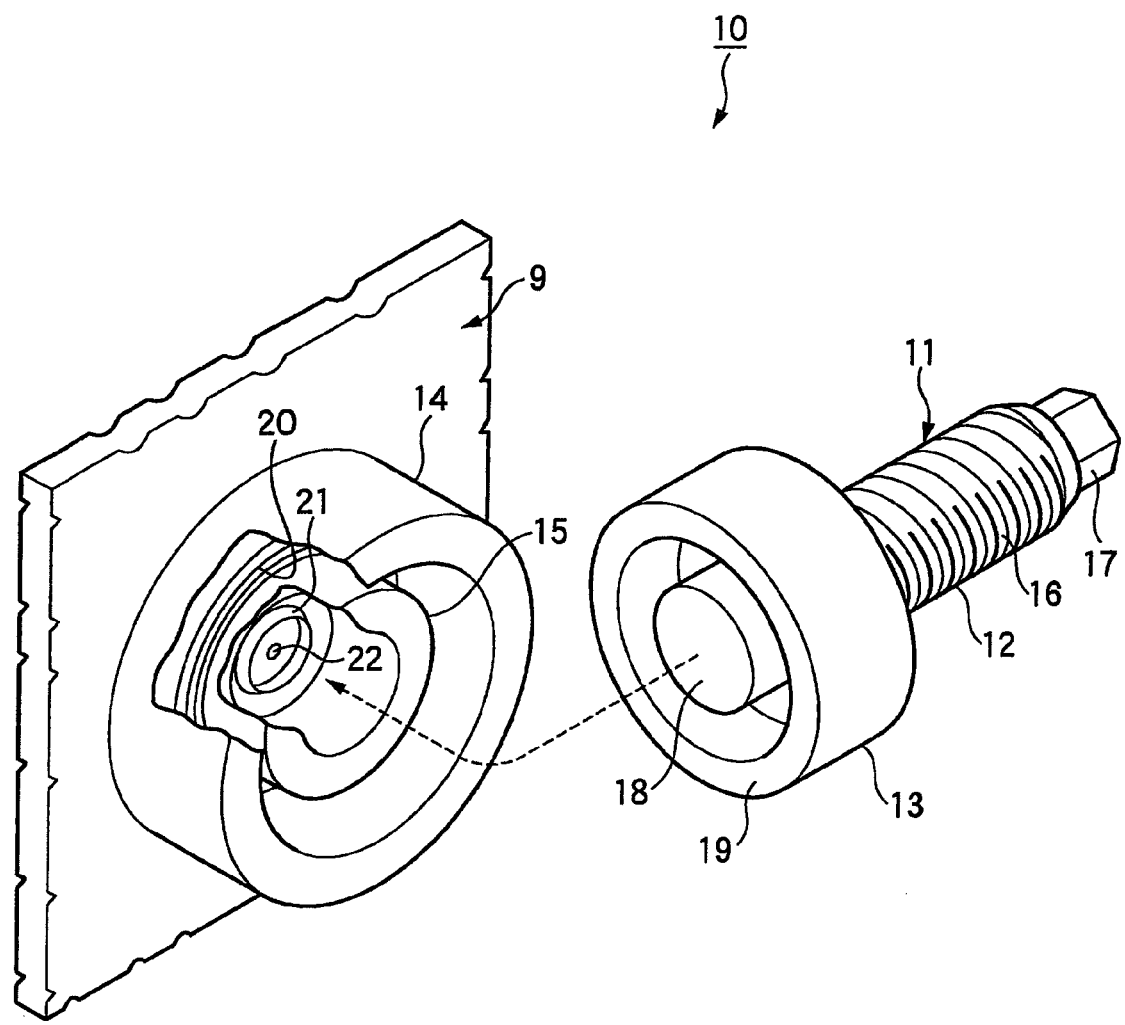
FIG. 2 is an external perspective view showing a first member and a second member of a fixing portion of the vehicle lamp shown in FIG. 1.
Figure 3:
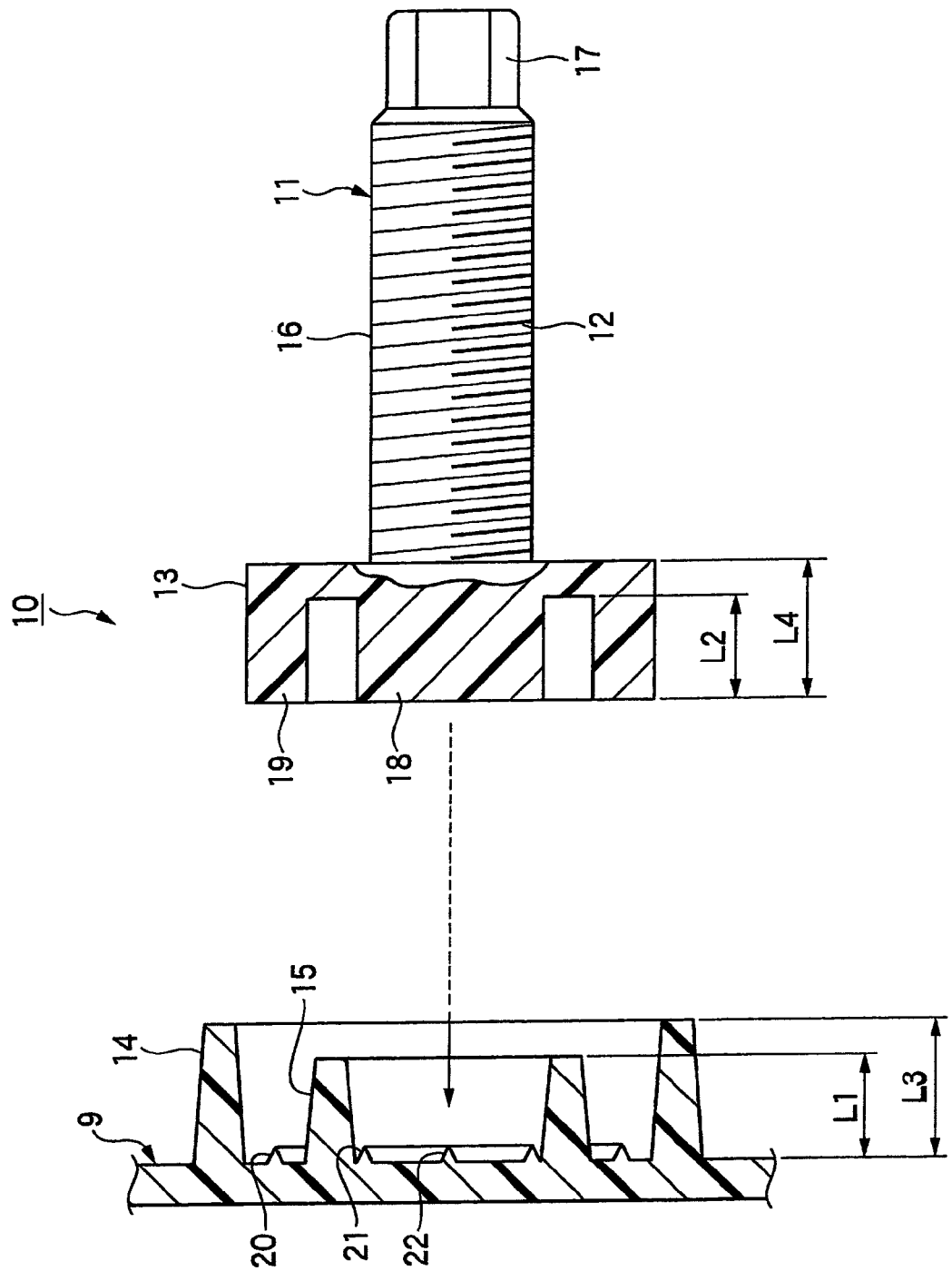
FIG. 3 is a partially cutaway side view showing a state before welding to explain a procedure of the welding method according to the first embodiment of the invention.
Figure 4:
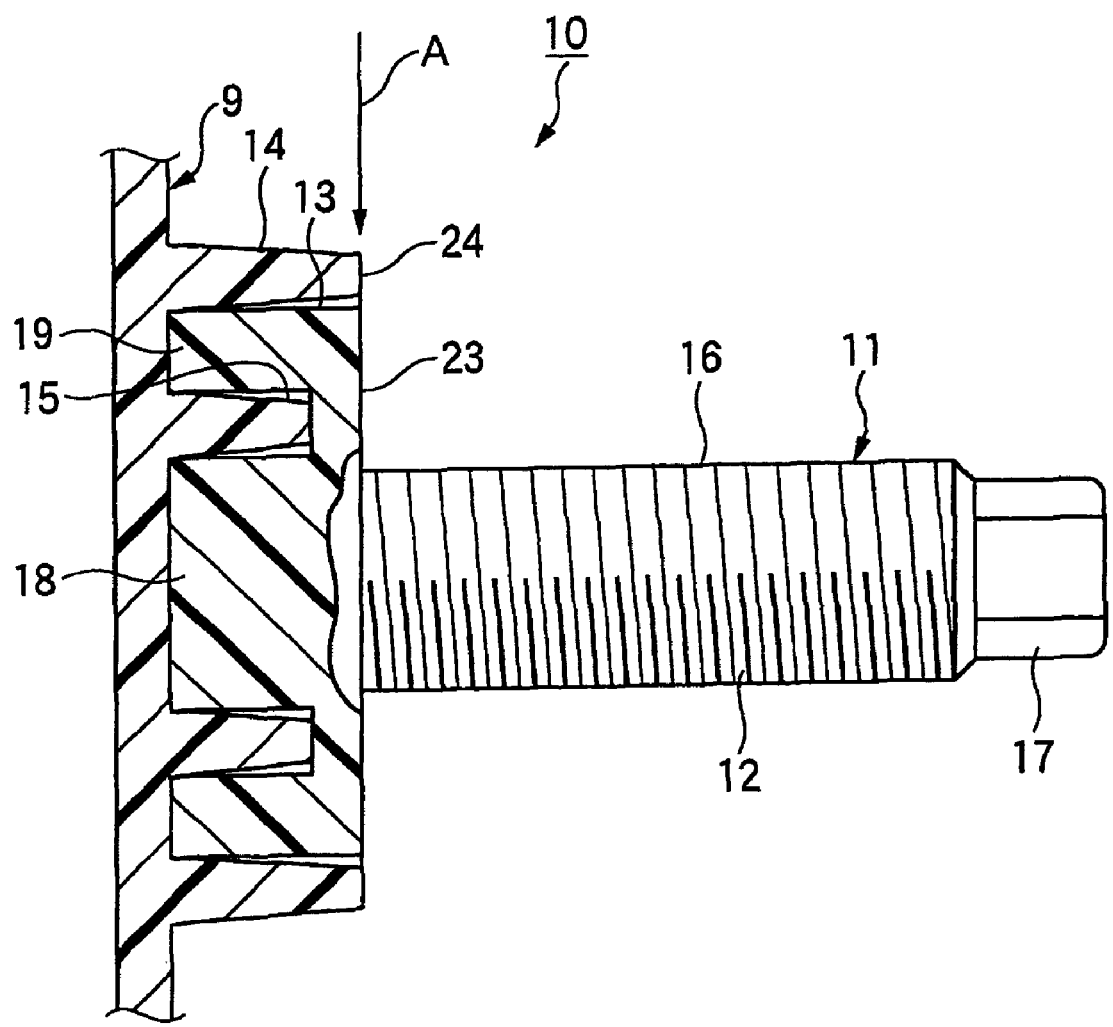
FIG. 4 is a partially cutaway side view showing a state after welding to explain the procedure of the welding method according to the first embodiment of the invention.

FIGS. 1 to 4 show an attaching construction and a welding method according to a first embodiment of the invention. FIG. 1 is a sectional view of a vehicle lamp to which an attaching construction and a welding method according to a first embodiment of the invention are applied. FIG. 2 is an external perspective view showing a first member and a second member of a fixing portion of the vehicle lamp shown in FIG. 1. FIG. 3 is a partially cutaway side view showing a state before welding to explain a procedure of the welding method according to the first embodiment of the invention. FIG. 4 is a partially cutaway side view showing a state after welding to explain the procedure of the welding method according to the first embodiment of the invention.

As is shown in FIG. 1, a vehicle lamp 1 to which an attaching construction and a welding method according to the first embodiment of the invention are applied may be used as a head lamp of a vehicle. This vehicle lamp 1 includes a reflector 6 for reflecting forwards light from a light source 5 within a lamp compartment 4, which is partitioned and defined by a lamp body 2 configured to be open on a front side thereof and a transparent resin front cover 3 mounted in the front opening. In addition, the vehicle lamp 1 also includes an extension 7 disposed around an outer circumference at a front end of the reflector 6, and a shade 8 for cutting off light emitted forwards directly from the light source 5.

The lamp body 2 is made from a resin and may be molded using a polymeric material such as polycarbonate resin, polycarbonate ABS resin, acryl nytril styrene acrylate (ABS resin), and acrylic resin (PMMA). The lamp body 2 has a fixing portion 10 on a rear surface side of a lamp body main body 9, which constitutes an attaching surface.

As is shown in FIG. 2, the fixing portion 10 includes a first member 11 having a holding portion 12 and a welding portion 13, as well as an outer annular and circular cylindrical first positioning rib 14 and an inner annular and circular cylindrical second positioning rib 15, which are provided on the side of the lamp body main body 9 that corresponds to a second member in such a manner that the second positioning rib 15 is situated radially inwards of the first positioning rib 14.

The first member 11 may be molded using the same resin material as that of the lamp body 2. Also, the holding portion 12 and the welding portion 13 may be molded integrally. In addition, the first member 11 may be such that a metallic bolt, which constitutes the holding portion 12, and a resin molded welding portion 13 are molded integrally.

The holding portion 12 is formed into a shaft shape and has an external thread portion 16 on an outer circumference thereof. The holding portion 12 has a gripped portion 17, which has, for example, a hexagonal shape, at a distal end portion, which is opposite to a proximal portion side of the external thread portion 16.

As is shown in FIGS. 2 and 3, the welding portion 13 includes a circular cylindrical welding portion 18 at a central portion and a circular tubular welding portion 19 having a circular tubular portion on an outer circumference of the circular cylindrical welding portion 18. Both end faces of these circular cylindrical welding portion 18 and circular tubular welding portion 19 are disposed on the same plane. In addition, in this welding portion 13, the circular cylindrical welding portion 18 and the circular tubular welding portion 19 constitute a raised and recessed configuration, which is associated with the shape of the first positioning rib 14 as will be described later.

The first positioning rib 14 is formed into an outer annular cylindrical tubular portion having an inside diametrical dimension slightly larger than an outside diametrical dimension of the circular tubular welding portion 19 of the first member 11 and projects towards the first member 11 from the lamp body main body 9 side. This first positioning member 14 is tapered in such a manner that its thickness is reduced as it extends towards a projecting distal end thereof.

The second positioning rib 15 is formed into an inner annular circular tubular shape having an outside diametrical dimension sufficiently smaller than the inside diametrical dimension of the first positioning rib 14 and an inside diametrical dimension slightly smaller than an inside diametrical dimension of the circular cylindrical welding portion 18. In addition, this second positioning rib 15 projects from the lamp body main body 9 side to a height that is lower than the first positioning rib 14. In addition, as with the first positioning rib 14, the second positioning rib 15 is tapered in such a manner that its thickness is reduced as it extends towards a projecting distal end thereof.

In addition, a first fusible rib 20 is formed on the lamp body main body 9 side between the first positioning rib 14 and the second projection rib 15 in such a manner as to project towards the first member 11, and the first fusible rib 20 is formed into a single annular shape and has a triangular section.

Additionally, a second fusible rib 21 is formed on the lamp body main body 9 side in a position radially inwards of the second positioning rib 15, and the second fusible rib 21 is formed into an annular shape and has a triangular section. On top of this, a third fusible rib 22 is formed in a central position of the second fusible rib 21 in such a manner as to project towards the first member 11, and this third fusible rib 22 has a circular conical shape.

Moreover, the first positioning rib 14 and the second positioning rib 15 cooperate to form a raised and recessed configuration, which is associated with the shapes of the circular cylindrical welding portion 18 and the circular tubular welding portion 19.

Next, referring to FIGS. 3 and 4, a procedure of a welding method according to the first embodiment of the invention will be described below.

As is shown in FIG. 3, the circular cylindrical welding portion 18 of the first member 11 has a height dimension L2 that is the same as a projecting dimension L2 of the second positioning rib 15 on the lamp body main body 9 side, and the circular tubular welding portion 19 of the first member 11 has a height dimension L4 that is the same as a projecting dimension L3 of the first positioning rib 14 on the lamp body main body 9 side.

Firstly, at a first step (a positioning step), the gripped portion 17 is held by a chuck of, for example, a household electric drill, and thereafter, the welding portion 13 is pushed to travel towards the first positioning rib 14 while being lodged into the inside diameter of the first positioning rib 14. As this occurs, the circular cylindrical welding portion 18 of the first member 11 is made to travel while being guided by the tapered shape of the second positioning rib 15 to thereby be centered, while the circular tubular welding portion 19 of the first member 11 is made to travel while being guided by the tapered shape of the first positioning rib 14, whereby the first member 11 is accurately positioned in place on the lamp body main body 9 side without any positioning error.

Next, at a second step (a welding step), the first member 11 is rotated by driving of the electric drill, which is holding the gripped portion 17 of the first member 11 at a rotational speed of, for example, 960 rpm (revolutions per minute). In addition, in the event that factory installed equipment is used in place of the electric drill, the lamp body 2 is fixed in place on a fixed side jig in advance, and the first member attached to a movable side jig is then caused to travel towards the second member while a rotational center of the first member 11 is being lodged with the third fusible rib 22 on the lamp body main body 9 side.

As is shown in FIG. 4, the second fusible rib 21 and the third fusible rib 22 start to be fused from distal end portions thereof by friction heat generated by the end face of the circular cylindrical welding portion 18 of the first member 11 being brought into sliding contact with the second fusible rib 21 and the third fusible rib 22 within the second positioning rib 15. In addition, at the same time, the first fusible rib 20 starts to be fused from a distal end portion of the first fusible rib 20 by friction heat generated by the end face of the circular tubular welding portion 19 of the first member 11 being brought into sliding contact with the first fusible rib 20 within the first positioning rib 14.

Then, at a state where the welding portion 13 of the first member 11 has traveled to a predetermined position within the first positioning rib 14, i.e., a position A where a rear end face 23 of the welding portion 13 and a projecting end face 24 of the first positioning rib 14 coincide with each other, the pushing of the first member 11 is stopped. The predetermined position may be detected by, for example, an optical sensor that is disposed on an outer circumferential portion of the first positioning rib 14.

By this action, the first member 11 is welded, respectively, to an inner circumferential surface of the first positioning rib 14, inner and outer circumferential surfaces of the second positioning member 15 and an end face of the lamp body main body 9 on the distal end face, a side surface of the circular cylindrical welding portion 18, and the distal end face and inner and outer side surfaces of the circular tubular welding portion 19 in such a state that the circular cylindrical welding portion 18 and the circular tubular welding portion 19 are positioned, respectively, within the second positioning rib 15 and the first positioning rib 14.

As has been described above, according to the attaching construction of the first embodiment, the positioning of the first member 11 relative to the second member or the lamp body main body 9 is implemented by the welding portion 13 of the first member 11 being inserted in the inner circumferential surface side of the first positioning rib 14 of the lamp body main body 9, which constitutes the second member in such a manner that the welding portion 13 is brought into press contact with the second positioning rib 15, and thereafter by the welding portion 13 being rotated, the welding portion 13 is friction welded within the first positioning rib 14 and the second positioning rib 15 of the lamp body main body 9. By this action, the press fit amount of the welding portion 13 is made difficult to vary, and the positioning thereof relative to the first and second positioning ribs is ensured. In addition, as the necessity of providing a depth is obviated, a large securing force can be obtained. In addition, as the necessity of providing an external welding device is obviated, heat produced at the time of welding can be made difficult to be conducted to the lamp body main body 9 side. Consequently, not only can a reduction in size of the attaching configuration be realized by reducing the depth dimension, but also, high positioning accuracy can be obtained. Additionally, not only can the large securing force be obtained, but also, a reduction in production costs can be realized.

In addition, according to the attaching construction of one or more embodiments, the positioning of the first member 11 relative to the second member or the lamp body main body 9 is implemented by the gripped portion 17 of the first member 11 being gripped by an electric drill or the like and the welding portion 13 of the first member 11, which has the raised and recessed configuration, being inserted into the first positioning member 14 and the second positioning member 15, which constitute the raised and recessed configuration on the lamp body main body 9, which constitutes the second member. In addition, by driving the electric drill or the like, the welding portion 13 of the first member 11 is rotated to thereby be friction welded extremely easily within the first positioning rib 14 and the second positioning rib 15 of the lamp body main body 9.

In addition, according to the attaching construction of one or more embodiments, when the welding portion 13 of the first member 11 is rotated while being brought into press contact with the second positioning rib 15 of the lamp body main body 9, which constitutes the second member, the first, second, and third fusible ribs 20, 21, 22, which are provided to obtain the welding margin, are fused in a positive fashion, whereby the first member 11 can be welded in place without any positioning error.

Additionally, according to one or more embodiments, the welding method includes the positioning step in which the welding portion 13 of the first member 11 is positioned within the second positioning rib 15 on the lamp body main body 9, which constitutes the second member, and the welding step in which the welding portion 13 is friction welded within the first positioning rib 14 and the second positioning rib 15 on the lamp body main body 9 while the first member 11 is being rotated. By this configuration, the press fit amount of the welding portion 13 is made difficult to vary, and the positioning thereof relative to the first and second positioning ribs is ensured. In addition, as the necessity of providing a depth is obviated, a large securing force can be obtained. In addition, the necessity of providing an external welding device is obviated. Consequently, not only can a reduction in size of the attaching configuration be realized by reducing the depth dimension, but also, high positioning accuracy can be obtained. Additionally, not only can the large securing force be obtained, but also, a reduction in production costs can be realized.

Second Embodiment

Figure 5:
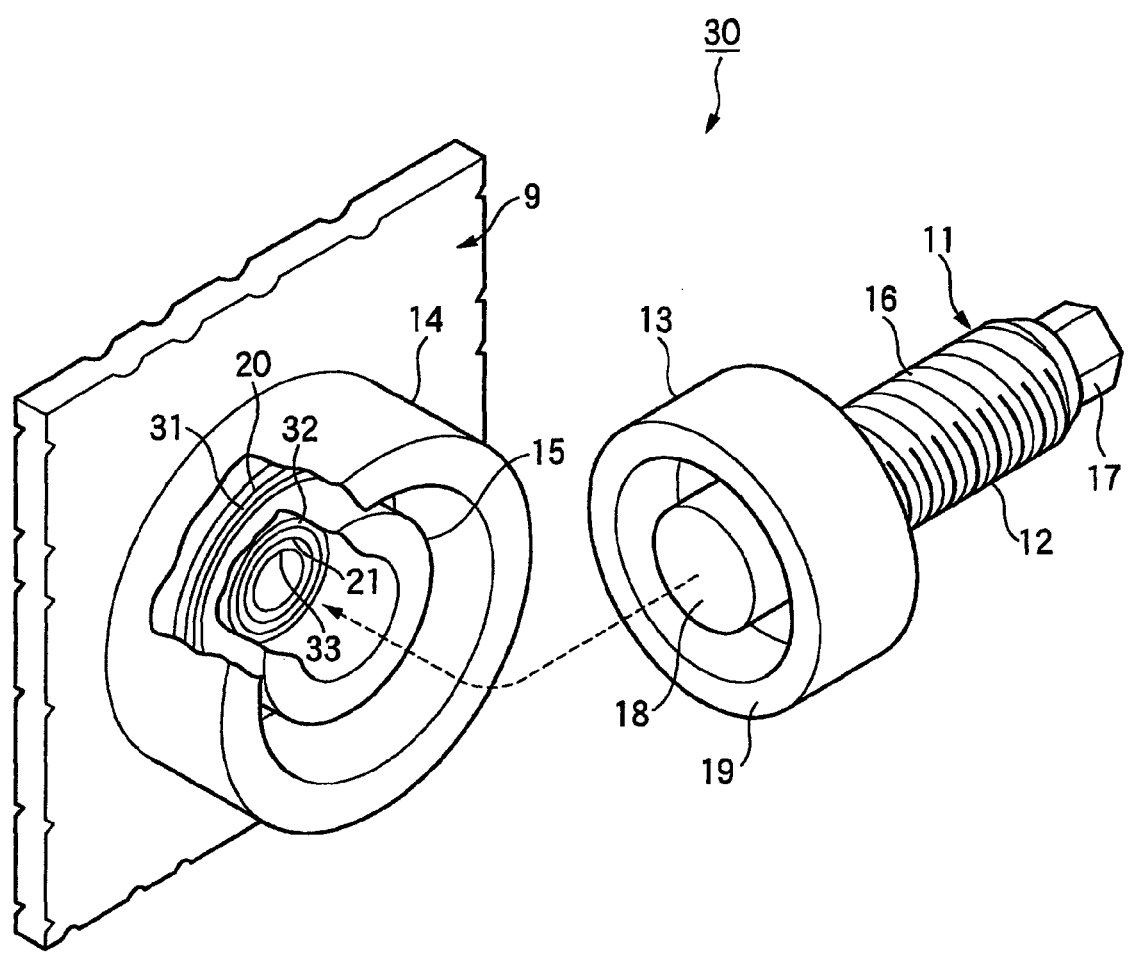
FIG. 5 is an external perspective view showing a first member and a second member of a fixing portion of a vehicle lamp to which an attaching construction and a welding method according to a second embodiment of the invention are applied.
Figure 6:
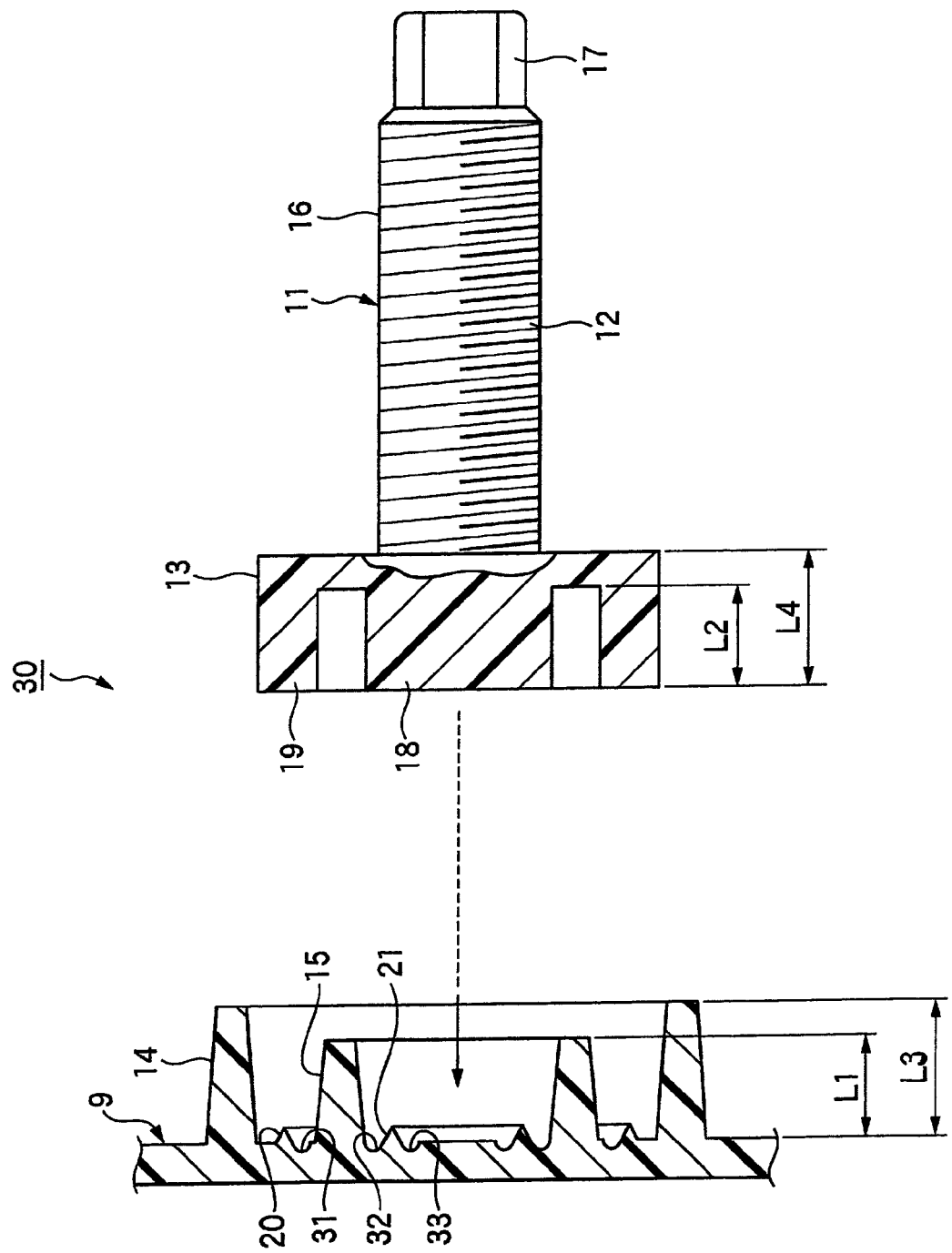
FIG. 6 is a partially cutaway side view showing a state before welding to explain a procedure of the welding method according to the second embodiment of the invention.
Figure 7:
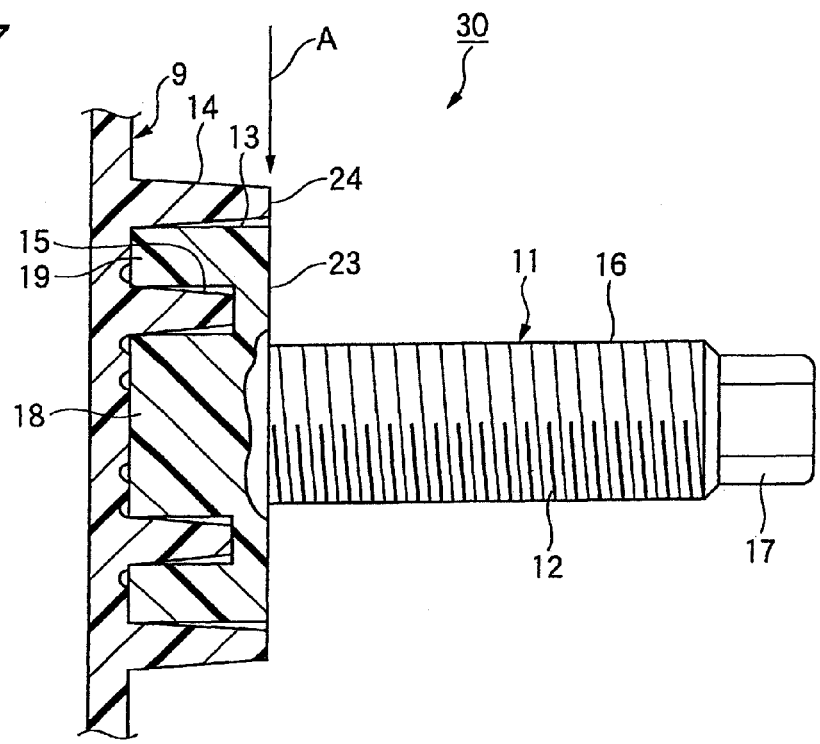
FIG. 7 is a partially cutaway side view showing a state after welding to explain the procedure of the welding method according to the second embodiment of the invention.
Figure 8:
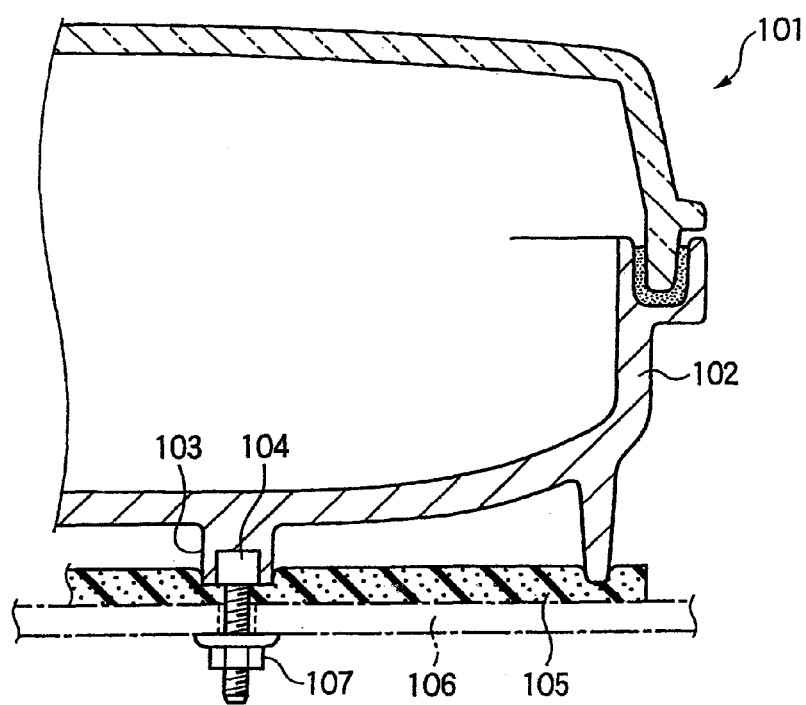
FIG. 8 is a sectional view showing an attaching construction and a welding method of the related art.

Next, referring to FIGS. 5 to 7, an attaching construction and a welding method according to a second embodiment of the invention will be described. FIG. 5 is an external perspective view showing a first member and a second member of a fixing portion of a vehicle lamp to which an attaching construction and a welding method according to a second embodiment of the invention are applied. FIG. 6 is a partially cutaway side view showing a state before welding to explain a procedure of the welding method according to the second embodiment of the invention. FIG. 7 is a partially cutaway side view showing a state after welding to explain the procedure of the welding method according to the second embodiment of the invention. Note that in the description of the second embodiment, like or corresponding reference numerals will be imparted to constituent elements that are the same as those of the first embodiment or constituent elements which function in a similar way to those of the first embodiment, so as to simplify the description.

As is shown in FIG. 5, a fixing portion 30 of a vehicle lamp 1 to which an attaching construction and a welding method according to the second embodiment are applied includes a first member 11 having a holding portion 12 and a welding portion 13, as well as an outer annular and circular cylindrical first positioning rib 14 and an inner annular and circular tubular second positioning rib 15 formed on a side of a lamp body main body 9, which constitutes a second member, in such a manner that the second positioning rib 15 is situated radially inwards of the first positioning rib 14. In addition to this, a raised annular first fusible rib 20 and a recessed annular first concave groove 31 are formed on the lamp body main body 9 between the first positioning rib 14 and the second positioning rib 15 in such a manner that the first concave groove 31 is situated on an inner circumferential side of the first fusible rib 20. Additionally, a raised annular second fusible rib 21 is formed on the lamp body main body 9 side in such a manner as to be situated radially inwards of an inner circumference of the second positioning rib 15, a recessed annular second concave groove 32 is formed to be situated on an outer circumferential side of the second fusible rib 21, and a recessed annular third concave groove 33 is formed to be situated on an inner circumferential side of the second fusible rib 21.

Next, referring to FIGS. 6 and 7, a procedure of the welding method according to the second embodiment of the invention will be described.

As is shown in FIG. 6, firstly, at a first step (a positioning step), the first member 11 is caused to travel towards the first positioning rib 14. As this occurs, a circular cylindrical welding portion 18 of the first member 11 is guided by a tapered shape of the second positioning rib 15 to thereby be centered, and a circular tubular welding portion 19 of the first member 11 is caused to travel while being guided by a tapered shape of the first positioning rib 14 to thereby be centered. Then, the first member 11 is positioned by the second positioning rib 15 being brought into press contact between the circular cylindrical welding portion 18 and the circular tubular welding portion 19. By this configuration, the first member 11 is positioned accurately relative to the lamp body main body 9 without any positioning error.

Next, at a second step (a positioning step), a gripped portion 17 of the first member is held by an electric drill or the like so as to rotate the welding portion 13 of the first member 11 within the first positioning rib 14 and the second positioning rib 15.

As is shown in FIG. 7, the second fusible rib 21 starts to be fused from a distal end portion thereof by friction heat generated by an end face of the circular cylindrical welding portion 18 of the first member 11 being brought into sliding contact with the second fusible rib 21 within the second positioning rib 15. In addition, at the same time as this occurs, the first fusible rib 20 starts to be fused from a distal end portion thereof by friction heat generated by an end face of the circular tubular welding portion 19 of the first member 11 being brought into sliding contact with the first fusible rib 20 within the first positioning rib 14.

As this occurs, a resin material of the first fusible rib 20 so fused is accommodated within the first concave groove 31 as the first member 11 is being pushed to travel as described above, whereby the distal end face and inner and outer side surfaces of the circular cylindrical welding portion 19 of the first member 11 and a surface of the lamp body main body 9 are welded together. In addition, a resin material of the second fusible rib 21, which started to be fused as the same time as the first fusible rib 20 did, is accommodated within the second concave groove 32 and the third concave groove 33, whereby the distal end face and an outer circumferential surface of the circular cylindrical welding portion 18 of the first member 11 and the surface of the lamp body main body 9 are welded together.

Because the attaching construction and the welding method of the second embodiment provide the same functions and advantages as those of the first embodiment, the description thereof will be omitted herein. However, according, in particular, to the second embodiment, by the fused resin materials of the first fusible rib 20 and the second fusible rib 21 being accommodated in the first, second, and third concave grooves 31, 32, 33, a positioning error of the first member 11 in the axial direction can be eliminated in an ensured fashion.

Note that the invention is not limited to the embodiments that have been described above. Those skilled in the art will appreciate that various modifications and improvements made be made as required. In addition, the materials, shapes, dimensions, numeric values, forms, and numbers of the constituent elements, as well as locations thereof are not limited to those described in the embodiments and hence are arbitrary, provided that the invention can be attained.

For example, the vehicle lamp is not limited to the head lamp, but can be applied to a tail lamp or any other vehicle lamps. In addition, the number of fusible ribs is not limited to two or three as illustrated in the drawings and may be set in a selective fashion. In addition, a semi-circular sectional shape or an isosceles trapezoidal sectional shape may be adopted for the shape of the fusible ribs in addition to the triangular sectional shape.

While description has been made in connection with exemplary embodiments of the present invention, it will be obvious to those skilled in the art that various changes and modifications may be made therein without departing from the present invention. It is aimed, therefore, to cover in the appended claims all such changes and modifications falling within the true spirit and scope of the present invention.

DESCRIPTION OF THE REFERENCE NUMERALS 1 vehicle body lamp; 9 lamp body main body (second member); 10 fixing portion; 11 first member; 12 holding portion; 13 welding portion; 14 first positioning rib; 15 second positioning rib; 20 first fusible rib (fusible rib); 21 second fusible rib (fusible rib); 22 third fusible rib (fusible rib); 30 fixing portion.

What is claimed is:

1. An attaching construction comprising:
   a first member comprising:
      a circular tubular welding portion at a distal end and, at a rear end thereof, a holding portion integral with the welding portion; and
   a second member comprising:
      an annular first positioning rib, and an annular second positioning rib inside the first positioning rib,
   wherein the welding portion is positioned within the first positioning rib, and
   wherein the welding portion is friction welded in place within the first positioning rib while the first member is rotated,
   wherein the welding portion comprises:
      a raised and recessed configuration comprising:
         a circular cylindrical welding portion at a center thereof, and
         a circular tubular welding portion disposed at a position in an outer radial direction from the circular cylindrical welding portion,
   wherein a raised and recessed configuration is formed by the first positioning rib and the second positioning rib in such a manner as to be associated with the welding portion, and
   wherein the welding portion is inserted into the first positioning rib to thereby be brought into press contact with the second positioning rib so as to be positioned in place within the first position rib.

2. The attaching construction according to claim 1, wherein either the first member or the second member comprises a fusible rib, which is fused at the time of welding.

3. A welding method for welding a first member to a second member, wherein
   the first member comprises:
      a welding portion, and a holding portion integral with the welding portion; and
   the second member comprises:
      a first positioning rib, and a second positioning rib inside the first positioning rib,
   the method comprising:
      a positioning step in which the welding portion is positioned within the first positioning rib; and
      a welding step in which the welding portion is friction welded in place within the first positioning rib while the first member is rotated,
   wherein the welding portion comprises:
      a raised and recessed configuration comprising:
         a circular tubular welding portion disposed at a position in an outer radial direction from the circular cylindrical welding portion, wherein a raised and recessed configuration is formed by the first positioning rib and the second positioning rib in such a manner as to be associated with the welding portion, the method further comprising:

inserting the welding portion into the first positioning rib thereby bringing the welding portion into press contact with the second positioning rib so as to be positioned in place within the first position rib.

4. The welding method according to claim 3, wherein either the first member or the second member comprises a fusible rib, the method further comprising: fusing the fusible rib at the time of welding.

* * * * *

UNITED STATES PATENT AND TRADEMARK OFFICE
CERTIFICATE OF CORRECTION

| | | |
|---|---|---|
| PATENT NO. | : 7,909,230 B2 | Page 1 of 1 |
| APPLICATION NO. | : 12/327411 | |
| DATED | : March 22, 2011 | |
| INVENTOR(S) | : Yoshiaki Aiso | |

It is certified that error appears in the above-identified patent and that said Letters Patent is hereby corrected as shown below:

In the Claims:

In Claim 3, column 10, line 63, after the word "comprising:" insert the phrase

-- a circular cylindrical welding portion at a center thereof, and --.

Signed and Sealed this
Thirty-first Day of May, 2011

David J. Kappos
*Director of the United States Patent and Trademark Office*